UNITED STATES PATENT OFFICE.

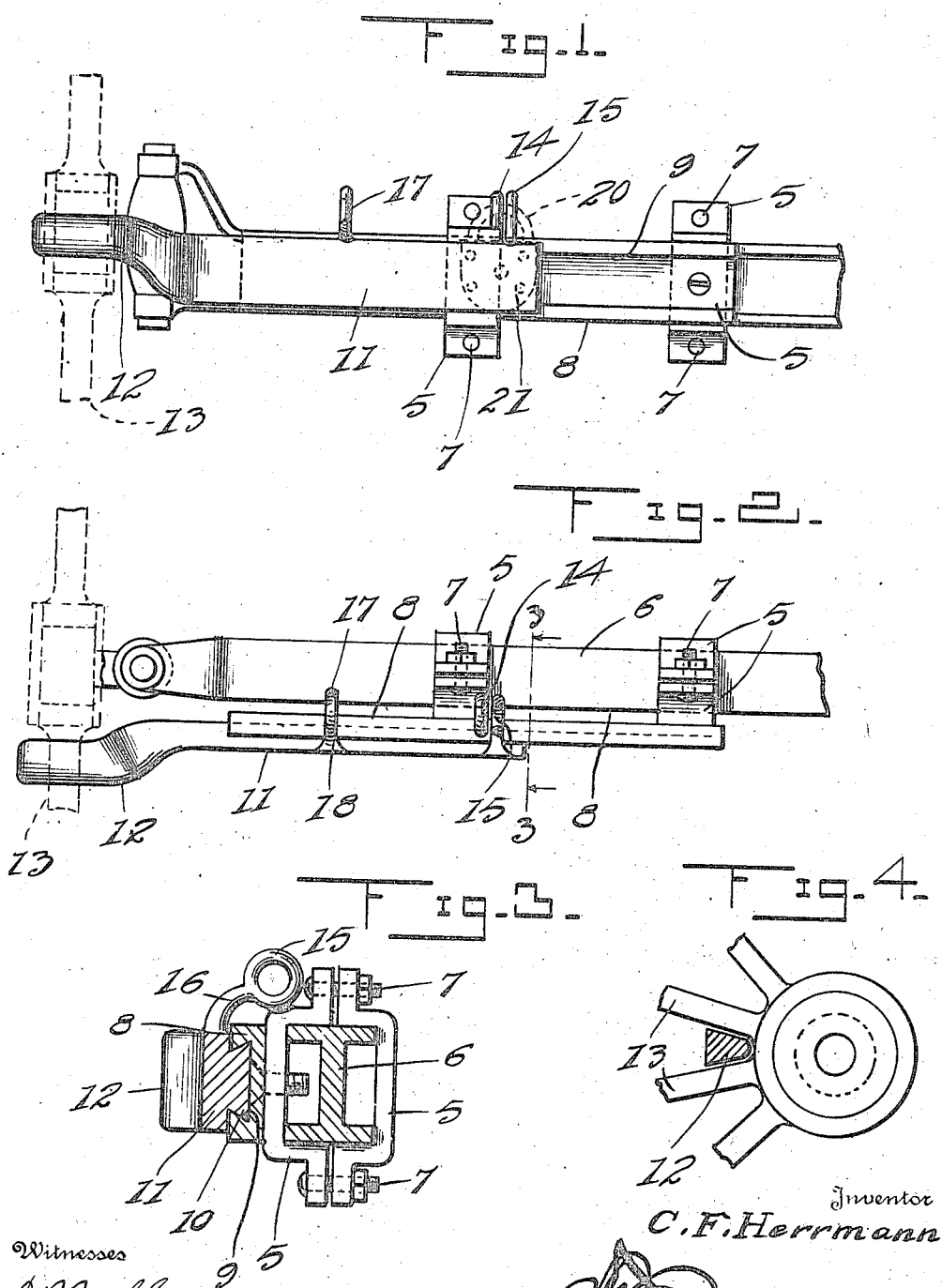

CARL F. HERRMANN, OF CHICAGO, ILLINOIS.

WHEEL-LOCK.

1,160,893. Specification of Letters Patent. Patented Nov. 16, 1915.

Application filed March 13, 1915. Serial No. 14,290.

*To all whom it may concern:*

Be it known that I, CARL F. HERRMANN, a citizen of the United States, residing at Chicago, in the county of Cook and State of Illinois, have invented certain new and useful Improvements in Wheel-Locks; and I do hereby declare the following to be a full, clear, and exact description of the invention, such as will enable others skilled in the art to which it appertains to make and use the same.

This invention has for its object to provide a simple and efficient lock especially designed for attachment to the front or rear axle of a motor vehicle and including a slidable bolt or locking member movable into position between the spokes of one of the wheels to reliably lock the latter against rotation and thus prevent an unauthorized person from using the vehicle.

Another object is to provide means for locking the bolt or locking member in extended or locked position.

With these and other objects in view, the invention consists in the novel construction, arrangement and formation of parts as will be hereinafter specifically described, claimed and illustrated in the accompanying drawing, in which:

Figure 1 represents a front elevation of the invention applied to use. Fig. 2 represents a top plan view thereof. Fig. 3 represents a transverse sectional view on the line 3—3 of Fig. 2. Fig. 4 represents a fragmental side elevation of a vehicle wheel, illustrating the bolt in position between two of the spokes thereof.

Referring to the drawing in detail, wherein similar reference numerals designate corresponding parts throughout the several views, the numerals 5 indicate pairs of attaching clips, which are adapted to be reliably secured upon the front or rear axle 6 of a vehicle by bolts 7 or equivalent means. A base plate 8 is rigidly secured to the clip 5 and is formed in its outer surface with a dove-tail groove 9 slidably receiving the correspondingly shaped rib 10 formed longitudinally upon the bolt or locking member 11 having an offset end 12 adapted, when the bolt is moved to extended position, to engage between the spokes 13 of one of the wheels of the vehicle.

One of the parts of one of the clips is formed with an apertured ear 14 adapted to be engaged by the enlarged apertured end 15 of an arm 16 secured to the bolt 11 to limit the outward movement of the latter. The inward movement of the bolt is limited by engagement of the enlarged apertured end 17 of an arm 18 secured to the bolt in spaced relation to the arm 16 and adapted to also engage the ear 14. When either of the arms 16 or 18 is moved into engagement with the ear 14 the apertures in these parts are moved into registration and are adapted to receive the shackle 20 of a pad lock 21, illustrated in dotted lines in Fig. 1, to reliably lock the bolt in extended or retracted position.

During use of the vehicle, the bolt 11 is moved inwardly so as to disengage the outer extremity 12 thereof from between the spokes 13 of the wheel, and the bolt is locked in retracted position to insure against the latter accidentally moving outwardly by the pad lock 21, the shackle 20 of which is engaged through the apertures in the ear 14 and enlarged end of the arm 18. When the vehicle is not in use and it is desired to prevent unauthorized persons from using the same, the bolt 11 is moved outwardly to the extended position illustrated in Figs. 1 and 2, the outer offset end 12 thereof engaging between the spokes of the wheel and thus preventing rotational movement of the latter. The bolt is reliably locked in extended position by engaging the shackle 20 of the pad lock through the registering apertures in the ear 14 and arm 16.

What I claim is:

A wheel lock comprising a pair of attaching clips, a base plate carried by said clips, a locking member slidably secured to said base plate, a pair of spaced apertured arms carried by said locking member, and an ear carried by one of said clips disposed between and adapted to be engaged by said arms to limit the inward and outward sliding movement of said locking member.

In testimony whereof I affix my signature in presence of two witnesses.

CARL F. HERRMANN.

Witnesses:
ROBERT H. MCCLELLAND,
CHARLES WESLEY COMMONS.